(12) United States Patent
Cusack

(10) Patent No.: US 9,204,657 B2
(45) Date of Patent: Dec. 8, 2015

(54) OUTDOOR COOKER WITH INTERNAL FIREBOX

(76) Inventor: William E. Cusack, Peoria, IL (US)

(*) Notice: Subject to any disclaimer, the term of this patent is extended or adjusted under 35 U.S.C. 154(b) by 202 days.

(21) Appl. No.: 13/556,723

(22) Filed: Jul. 24, 2012

(65) Prior Publication Data

US 2014/0030401 A1     Jan. 30, 2014

(51) Int. Cl.
*A23B 4/052* (2006.01)
*A23B 4/044* (2006.01)
*A47J 37/07* (2006.01)

(52) U.S. Cl.
CPC ............. *A23B 4/044* (2013.01); *A47J 37/0763* (2013.01)

(58) Field of Classification Search
CPC .............. A47J 37/0768; A47J 37/0754; A47J 37/0763; A23B 4/044
USPC ............ 126/28, 26, 25 C, 25 R; 99/476, 482, 99/473, 468
See application file for complete search history.

(56) References Cited

U.S. PATENT DOCUMENTS

| | | | | |
|---|---|---|---|---|
| 3,209,712 A * | 10/1965 | Arena | .......................... | 126/25 B |
| 3,343,527 A * | 9/1967 | Manteris | ....................... | 126/25 R |
| 4,700,618 A * | 10/1987 | Cox, Jr. | ........................... | 99/339 |
| 4,934,260 A * | 6/1990 | Blevins | .......................... | 99/482 |
| 5,429,110 A * | 7/1995 | Burke et al. | ................. | 126/25 R |
| 5,528,984 A * | 6/1996 | Saurwein | ......................... | 99/482 |
| 5,613,549 A * | 3/1997 | Dolwani | ........................ | 165/11.1 |
| 6,209,533 B1 * | 4/2001 | Ganard | ......................... | 126/25 R |
| 2002/0148458 A1 * | 10/2002 | Andress | ........................ | 126/25 R |
| 2004/0226454 A1 * | 11/2004 | Pirkle et al. | ...................... | 99/331 |
| 2010/0009053 A1 * | 1/2010 | Marr | .............................. | 426/523 |
| 2010/0263654 A1 * | 10/2010 | Cusack | ........................ | 126/25 R |

* cited by examiner

*Primary Examiner* — Steven B McAllister
*Assistant Examiner* — Steven Anderson, II
(74) *Attorney, Agent, or Firm* — Liell & McNeil

(57) ABSTRACT

An outdoor cooker is double walled insulated and has a completely removable internal firebox that defines a vertical column which includes a fuel and fire chamber separated from an ash and air chamber by a fire grate. The perimeter wall defines an air inlet that opens the air and ash chamber to an air supply passage through the cooker body, and further defines an exhaust outlet that opens into the inner chamber of the cooker. Consistent low cooking temperatures (200°-250° F.) without resupplying fuel or opening the outdoor cooker for 10-20 or more hours are easily accomplished. The outdoor cooker is also versatile enough to directly cook other meats, such as steaks, at high temperatures for total cook times that may only last a matter of minutes. The outdoor cooker can also be configured for medium temperature indirect and direct barbequing.

10 Claims, 3 Drawing Sheets

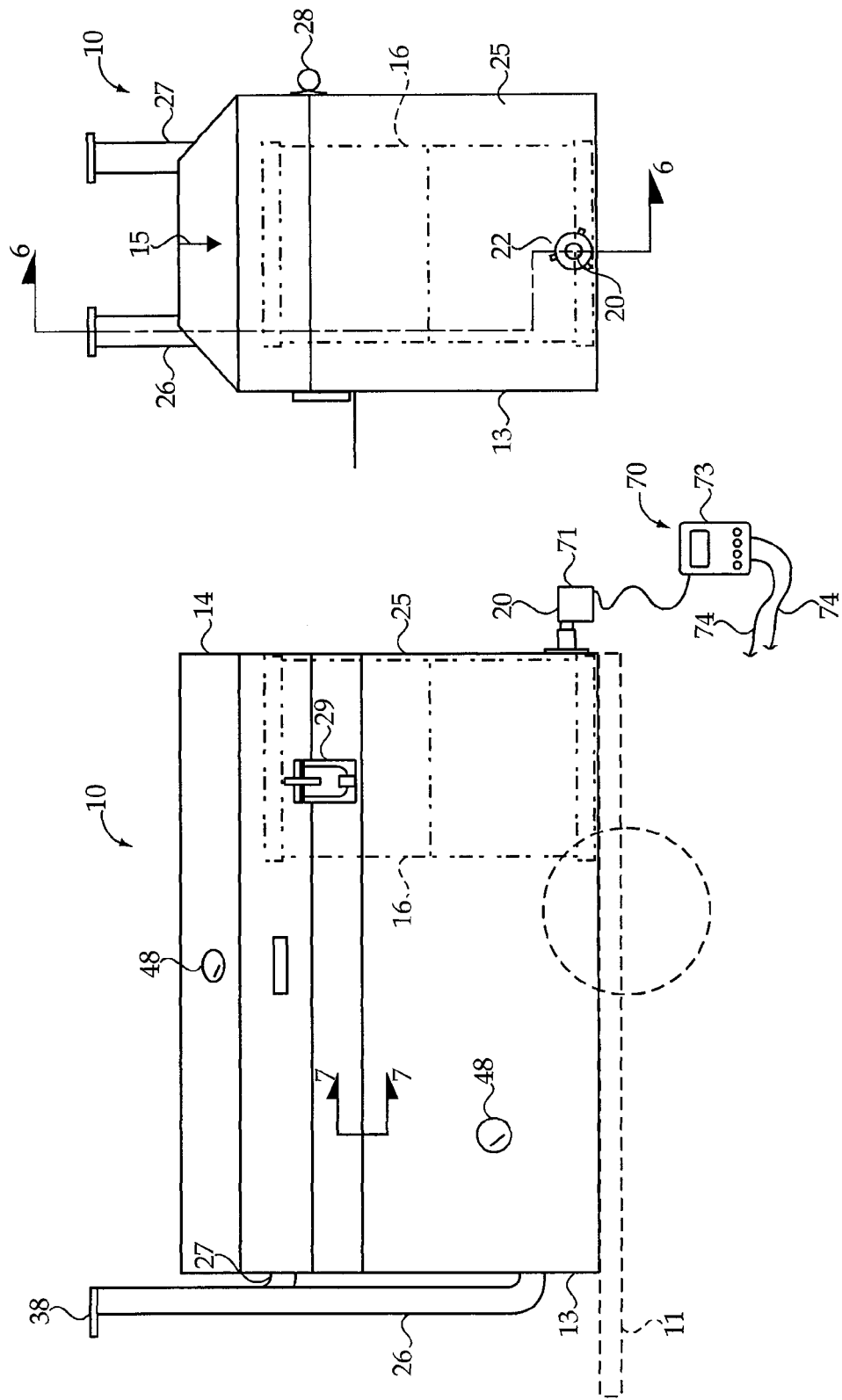

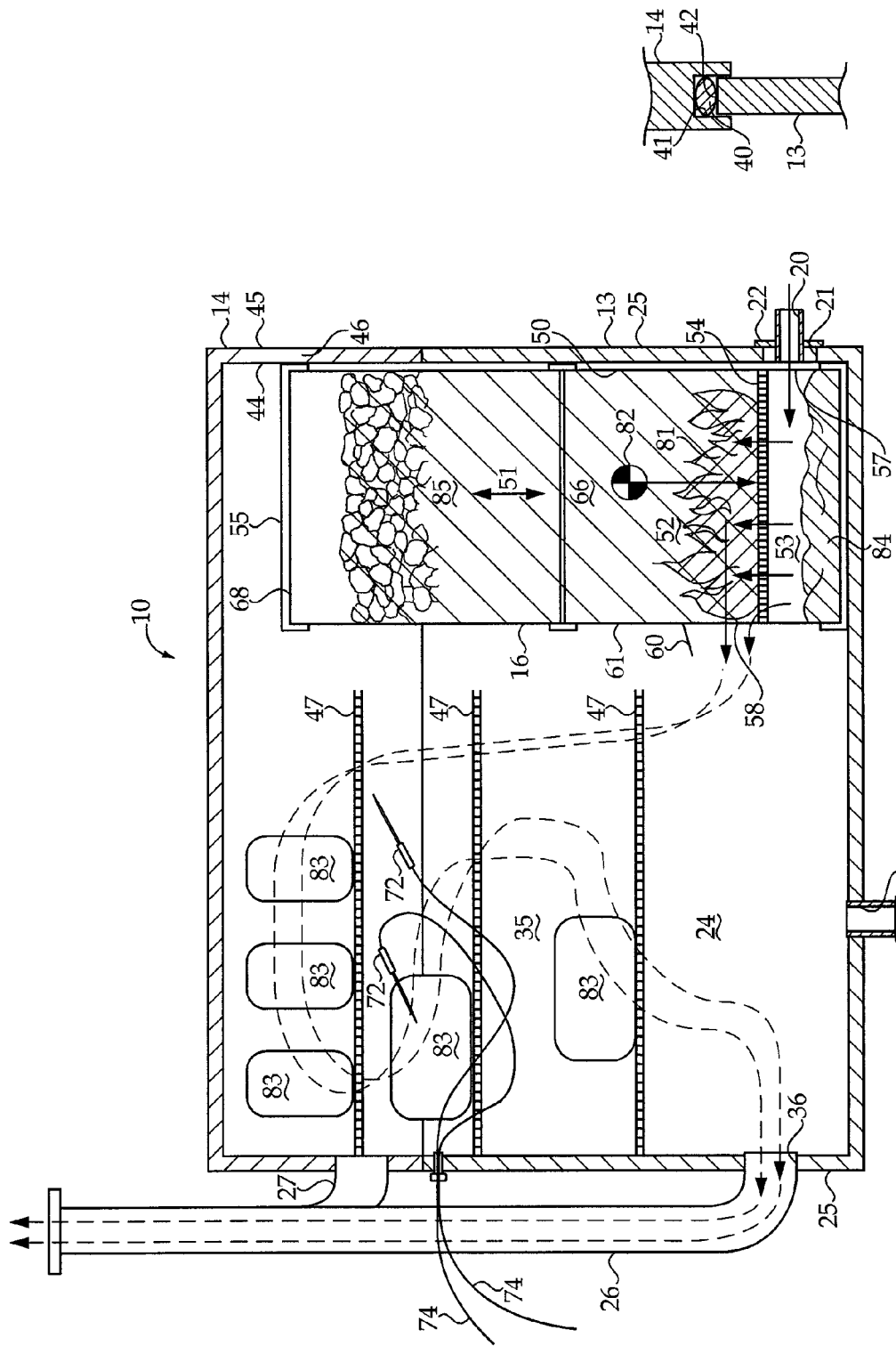

OUTDOOR COOKER WITH INTERNAL FIREBOX

TECHNICAL FIELD

The present disclosure relates generally to wood/charcoal based outdoor cookers, and more particularly to an outdoor cooker with an internal firebox.

BACKGROUND

Cooking food, particularly meats, outdoors can take on a wide variety of strategies from high temperature direct searing beef steaks, medium indirect cooking chicken, and slow low temperature smoking of pork shoulders, and many, many others. While most outdoor cookers are best suited by design for direct heat grilling, medium temperature barbequing or slow low temperature smoking, few outdoor cookers are well suited to all of these varieties of cooking strategies. Probably the most difficult type of outdoor cooking involves slow smoking of certain meats over many hours. One outdoor cooker that has exhibited an ability to perform well in any of the cooking strategies identified above is shown in co-owned U.S. Pat. No. 7,878,186.

Because slow smoking of meats almost always avoids the direct application of heat, the '186 patent shows a typical smoker design that includes an offset firebox attached to a main cooker body. This strategy allows a fire to be built and maintained over a long cooking period without necessarily opening the cooking chamber, which could expose the meat being cooked to temperature fluctuations. Thus, replenishing a fire and/or checking the status of food being cooked can undermine the ability of the cook to maintain a desired cooking temperature, which may be less than 250° F., consistently for 10, 15 or more hours. On the otherhand, utilizing the same cooker to quickly cook hamburgers or steaks over direct high heat for a matter of minutes can be extremely elusive.

This disclosure is directed toward one or more of the problems set forth above.

SUMMARY

In one aspect, an outdoor cooker includes a cooker body that defines an air supply passage that extends between an inner chamber and an outer surface. A lid is hinged to the cooker body and pivotable with respect to the cooker body between a closed position and an open position. A smoke stack is attached to one of the cooker body and the lid, and opens into the inner chamber. The perimeter seal is in contact with the cooker body and the lid when the lid is in the closed position, but out of contact with one of the lid in the cooker body when the lid is in an open position. An internal firebox is positioned in the inner chamber and has a perimeter wall defining a vertical column that includes a fuel and fire chamber separated from an ash and air chamber by a fire grate. The perimeter wall defines an air inlet that opens the air and ash chamber to the air supply passage, and further defines an exhaust outlet that opens to the fuel and fire chamber immediately above the fire grate. The internal fire box has a top cover movable between a closed position in contact with the perimeter wall, and an open position that permits fuel to be loaded into the fuel and fire chamber. The inner chamber includes a cooking volume positioned between the exhaust outlet and an opening to the smoke stack.

In another aspect, a method of operating an outdoor cooker includes building a fire on a fire grate of an internal firebox positioned in an inner chamber of the outdoor cooker. Fuel is loaded into the fuel and fire chamber of the internal firebox, and the weight of the fuel is supported by the fire grate. The top of the internal firebox is closed with a top cover. The inner chamber is closed by pivoting a lid to a closed position with respect to a cooker body. A smoke stack is opened. Food, which is located in the inner chamber, is cooked by moving air through an air supply passage defined by the cooker body, into an ash and air chamber of the internal firebox, up through the fire grate, out of the internal firebox and into the inner chamber through an exhaust outlet of the internal firebox, past the food, and out of the inner chamber through the smoke stack. The fire is gravity fed with fuel over time from fuel in the fuel and fire chamber. Ash generated by the fire in the fuel and fire chamber is gravity cleared down through the fire grate and into the air and ash chamber.

BRIEF DESCRIPTION OF THE DRAWINGS

FIG. 1 is a front view of an outdoor cooker according to the present disclosure;

FIG. 2 is a side view of the outdoor cooker of FIG. 1;

FIG. 6 is a front sectioned view through the outdoor cooker and internal firebox of FIGS. 1 and 2 as viewed along the sectioned line 6-6 of FIG. 2; and FIG. 7 is a partial sectioned view through the outdoor cooker of FIG. 1 as viewed along section lines 7-7 where the lid meets the cooker body.

DETAILED DESCRIPTION

Figure 5:
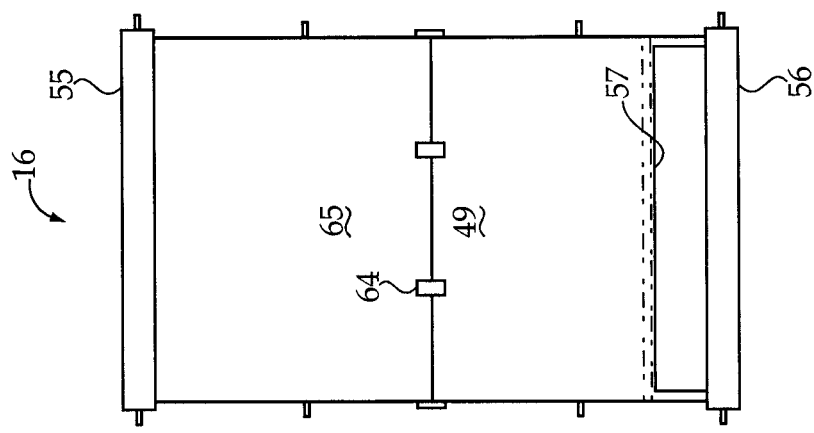
FIG. 5 is a right side view of the internal firebox of FIGS. 3 and 4.

Referring initially to FIGS. 1, 2, 6 and 7, an outdoor cooker 10 includes a cooker body that defines an air supply passage 20 that extends between an inner chamber 24 and an outer surface 25. A lid 14 is hinged to the cooker body 13 and pivotable with respect to the cooker body 13 between a closed position (as shown) and an open position. Although not necessary, the lid 14 may be connected to cooker body 13 with a spring biased hinge 28 of a type described in co-owned U.S. Pat. No. 7,878,186. The spring biased hinge 28 may be biased toward an open position so that the cooker 10 can be easily opened even when lid 14 weighs 100 or more pounds. The spring biased hinge 28 may also permit the lid to be stopped in a continuum of partially open positions without the use of props or counterweights. Both cooker body 13 and lid 14 may be double walled plate steel such that the inner chamber 24 is defined by an inner wall 44 that is separated from an outer wall 45 by insulation 46. In order to better seal cooker 10 from air leakage into or out of inner chamber 24, a perimeter seal 40 is in contact with cooker body 13 and lid 14 when lid 14 is in the closed position, as shown, but out of contact with one of the lid 14 and cooker body 13 when the lid 14 is in an open position. For instance, perimeter seal 40 may comprise fiberglass rope that is received in a U-shaped groove 41 defined by lid 14. The perimeter seal 40 may contact an edge 42 of cooker body 13 when the lid 14 is moved to a closed position. Although not necessary, cooker 10 may be equipped with a cam latch 29 that is movable between an unlatched position and a latched position, as shown, at which the perimeter seal 40 is squeezed, beyond a weight 15 of lid 14, between the lid 14 and cooker body 13. Cooker body 13 may also include a temperature probe port 30 that may define a small diameter opening, such as on the order of about ⅜ of an inch, to permit temperature probe lines 74 to extend into the inner chamber 24 when lid 14 is closed and latched, so that the temperature probe line 74 does not undermine proper sealing provided by perimeter seal 40. Temperature probe port 30 may have internal threads to receive an appropriate plug to close the temperature probe port when not in use. Cooker body 13 may also be equipped with a drain opening 33 that extends between inner chamber 24 and outer surface 25 through a floor of cooker body 13. Preferably, drain opening 33 includes external threads that receive a drain cap 34 to close drain opening 33 when cooker 10 is in use. In the illustrated embodiment, a first smoke stack 26 is attached to cooker body 13, and a second smoke stack 27 is attached to lid 14. Depending upon the cooking strategy, one or the other, or both, of smoke stacks 26 and 27 can be opened or closed utilizing smoke stack plates 38 that are attached at the exit to each smoke stack 26 and 27. Smoke stack 26 opens to inner chamber 24 at opening 36 at a low location, whereas smoke stack 27 may open into inner chamber 24 at an upper location. Although not necessary, FIG. 1 shows that outdoor cooker 10 may be mounted on a trailer 11 for easy transport. Nevertheless, stationary mounting strategies would also fall within the intended scope of the present disclosure. Inner chamber 24 is divided between a cooking volume 35, which may include a plurality of grates 47 upon which food 83 may be placed. The internal firebox 16 is preferably capable of being completely removed and separated from cooker body 13 for cleaning.

The internal firebox 16 is positioned in inner chamber 24 and has a perimeter wall 50 that defines a vertical column 51 that includes a fuel and fire chamber 52 separated from an ash and air chamber 53 by a fire grate 54. The perimeter wall 50 defines an air inlet 57 that opens the air and ash chamber 52 to the air supply passage 20. The perimeter wall 50 also defines an exhaust outlet 58 that opens from the fuel and fire chamber 52 immediately above fire grate 54 into inner chamber 24. Internal firebox 16 includes a top cover 55 that is movable between a closed position, as shown, in contact with perimeter wall 50, and an open position that permits fuel 85 to be loaded into fuel and fire chamber 52. The cooking volume 35 is positioned between the exhaust outlet 58 of internal firebox 16 and the opening 36 to smoke stack 26.

Figure 3:
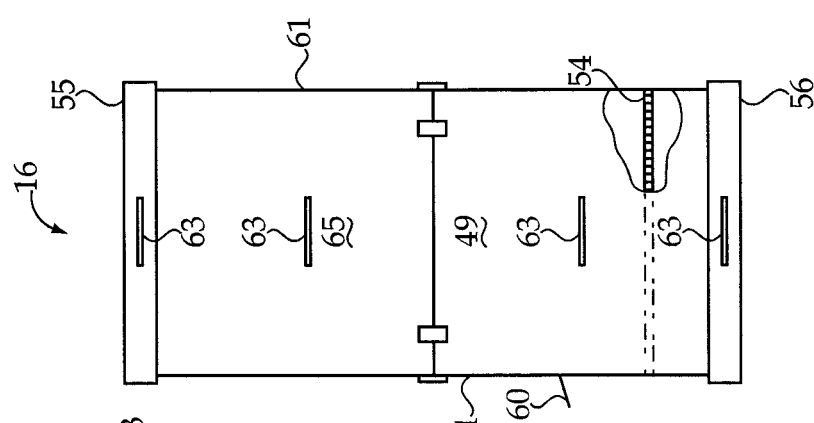
FIG. 3 is a front elevational view of an internal firebox after being removed from the outdoor cooker of FIGS. 1 and 2.
Figure 4:
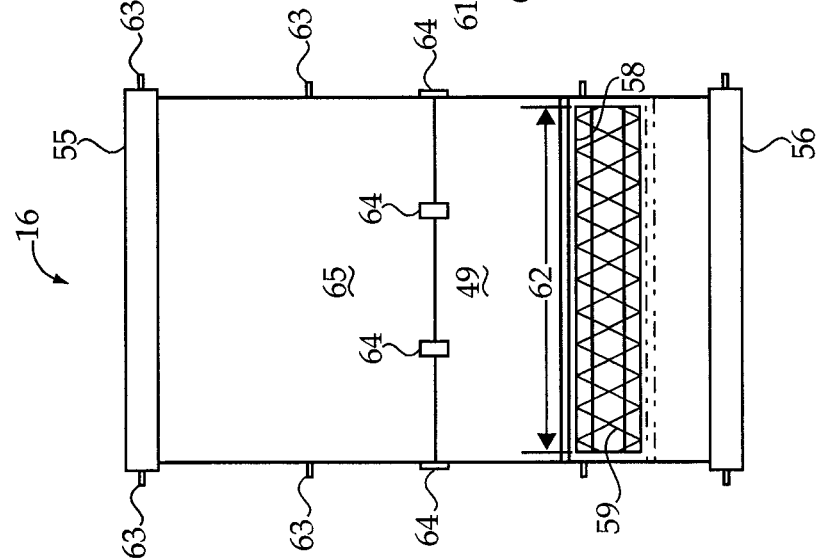
FIG. 4 is a left side view of the internal firebox of FIG. 3.

Referring in addition to FIGS. 3-5, the internal firebox 16 may include a hot coal barrier 59 that extends across exhaust outlet 58. In addition, a visor 60 may be attached to an external surface 61 of the perimeter wall 50 and positioned immediately above and extending a width 62 of exhaust outlet 58. Between hot coal barrier 59 and visor 60, interaction between grease drippings from the food 83 and hot coals in internal firebox 16 may be avoided. Preferably, internal firebox 16 is built around a base unit 49 that includes a lower segment of perimeter wall 50, defines air inlet 57 and exhaust outlet 58, and has fire grate 54 attached thereto. Base unit 49 may be open at the top and the bottom. However, internal firebox 16 preferably includes an ash collection tray 56 that is in contact with perimeter wall 50 and defines a bottom of the air and ash chamber 53. When being utilized for a long burn, the internal firebox 16 may include a vertical extension 65 that includes an upper segment of perimeter wall 50 and mates atop base unit 49 to more than double a volume 66 of the fuel and fire chamber 52. The mating may be accomplished by welding tabs to outer surface 61 of vertical extension 65 so that vertical extension 65 may be easily stacked atop base unit 49. Nevertheless, for shorter burns, vertical extension 65 may be omitted such that top cover 55 sits directly atop and in contact with base unit 49. Each of the ash collection tray 56, base unit 49, vertical extension 65 and top cover 55 may be equipped with side handles 63 to better facilitate lifting of the various components of internal firebox 16 into and out of cooker body 13.

The air flow through and temperature in inner chamber 24 may be manipulated by opening closing or partially opening smoke stack(s) 38. In addition, air flow into inner chamber 24 may also be supplemented by moving a venturi plate 22 that is mounted around air inlet opening 20 to open and close venturi openings 21 to greatly enlarge the inlet flow area into inner chamber 24. Venturi plate 22 and venturi openings 21 are more thoroughly described in co-owned U.S. Patent Publication US-2012-0012096-A1. Although these features permit air flow to be controlled naturally by convection forces, outdoor cooker 10 may also utilize a temperature control system 70 that includes a blower 71 that is mounted in air supply passage 20 and controlled in its operation by an electronic controller 73. In addition, the electronic controller 73 may received temperature information from within inner chamber 24 by a temperature sensor 72 that may continuously sense temperature in cooking volume 35 and/or one or more of the food items 83 in inner chamber 24. This temperature information is communicated to electronic controller 73 via sensor probe lines 74 in a manner well known in the art. Thus, electronic controller 73 may be considered to be in communication with both the temperature sensor(s) 72 and the blower 71. The electronic controller 73 may be configured to execute a temperature control algorithm to turn the blower 71 on and off responsive to a temperature in the inner chamber 24 being below or above, respectively, a preset cooking temperature. A fire 81 on fire grate 54 may be starved of air when the blower 71 is off, but air is forced into the air and ash chamber 53, up through fire grate 54 and, through fire 81 and out of exhaust outlet 58 into inner chamber 24 when the blower 71 is on.

INDUSTRIAL APPLICABILITY

The present disclosure is generally applicable to outdoor cookers. The outdoor cooker is specifically applicable for use by professionals and homeowners with a versatile system capable of short term direct high heat cooking, medium term indirect barbequing, and slow long term smoking of various food items, especially meats.

One method of using outdoor cooker 10 would be for long duration low temperature cooking of, for instance, pork shoulders or whole hogs positioned in cooking volume 35. When setting up outdoor cooker 10, the food may be positioned in cooking volume 35 before or after a fire is started. In any event, the process begins by unlatching cam latch 29 and pivoting lid 14 to an open position. Next, the top cover 55 of internal firebox 16 is opened and set aside. A fire 81, such as a small charcoal fire may be built directly on fire grate 54 or may be separately initiated in a conventional chimney starter and then poured onto fire grate 54. After the fire is built on fire grate 54, additional fuel 85 may be poured on top of fire 81 to fill or substantially fill volume 66. After the fuel 85 is added, the top cover 55 is returned and placed in contact with top 68 to close the top opening of vertical column 51. Although this results in a substantial amount of fuel being positioned in outdoor cooker 10, the rate at which the fuel 85 burns can be tightly controlled by the air supply into air and ash chamber 53, such as by utilizing temperature control system 70 as best shown in FIGS. 1 and 6. It should be noted that the fuel 85 positioned in internal firebox 16 has its weight 82 supported by fire grate 54. Thus, the fire 81 can be gravity fed with fuel over time from above. At the same time, ash 84 generated by fire 81 can be gravity cleared from the fuel and fire chamber 52 down through fire grate 54 to collect on ash collection tray 56. After the long term burn fuel 85, which may constitute charcoal and/or wood, is positioned in internal firebox 16, the top cover 55 may be replaced to close the top 68 of vertical column 51. Next, the inner chamber 24 may be closed by pivoting lid 14 to a closed position with respect to cooker body 13. One or both of smoke stack 26 and/or 27 may then be opened by appropriate rotation of one or more smokestack plates 38. The inner chamber 24 may be sealed against air leakage between the cooker body 13 and the lid 14 by pinching the perimeter seal 40 between the lid 14 and the cooker body 13 with cam latch 29.

With the cooker 10 closed, food 83 located in inner chamber 24 is cooked by moving air through the air supply passage 20, into the air and ash chamber 53 of the internal firebox 16, and up through the fire grate 54, through fire 81, and out of the internal firebox 16 and into the inner chamber 24 through the exhaust outlet 58. The heated smoke then moves past the food 83, such as by the swirl pattern illustrated in FIG. 6, and eventually leaves inner chamber 24 through smoke stack 26 or 27.

Utilizing only smokestack 26 may cause the temperature in cooking volume 35 to be more uniform or less stratified. On the otherhand, utilizing upper smokestack 27 may encourage stratification of temperatures in cooking volume 35 with the temperature near the top of outdoor cooker 10 being higher than the temperatures closer toward the bottom of inner chamber 24. Thus, depending upon what is being cooked and what temperature and techniques are desired, different air movement and temperature stratification strategies can be accomplished by using one or the other of smokestacks 26 and 27.

The cooking temperature within cooking volume 35 may be increased by increasing the airflow rate through air supply passage 20, such as by turning on blower 71. Likewise, the cooking temperature in inner chamber 24 may be reduced by reducing the airflow rate through air supply passage 20, such as by turning off blower 71. In a typical scenario, the temperature control system will activate to increase an air supply to fire 81 when the temperature sensor 72 indicates that the temperature and cooking volume 35 has dropped below a programmed desired cooking temperature. In addition, the blower may be responsive to the temperature control algorithm to shut off whenever temperature inside cooking volume 35 increases beyond some predetermined increment above a desired cooking temperature. The fire 81 may be starved of oxygen and actually put out, by stopping the airflow rate through the air supply passage 20. Often times, blower 71 may be equipped with a sliding feature that can actually close air supply passage 20 to incoming air, otherwise, convection forces could sustain fire 81 by dragging air through blower 71 even when the blower is turned off.

In some instances, such as during long burns, it may be necessary to add additional fuel to internal firebox 16 sometime during the cooking procedure. This may be indicated by the temperature control system 70 having an inability to sustain a desired cooking temperature even with the blower continuously on for several minutes. This could indicate either that the fire 81 has gone out or that the fuel supply in internal firebox 16 has been exhausted. Assuming that the fire 81 is still burning, one can open the lid 14 to an open position. The top cover 55 of the internal firebox 16 is also moved to an open position. Additional fuel 85 is then added to the internal firebox, such as by pouring charcoal into vertical column 51. The top cover 55 of internal firebox is then moved back to its closed position, and the lid 14 is pivoted back to its closed position with regard to cooker body 13. The temperature control system 70 then may cycle the blower 71 on and off until the internal temperature within cooking volume 35 returns to a stable predetermined cooking temperature.

Although not necessary, hot coals can be inhibited from escaping the internal firebox 16 into the inner chamber 24 with the barricade or hot/coal barrier 59 that extends across exhaust outlet 58. In addition, dripping grease or other liquids from the food item 83 may be inhibited from interacting with fire 81 by the use of visor 60 that extends over outlet opening 58. In addition, visor 60 may serve to better deflect heat flow through inner chamber 24 so that the temperature within cooking volume 35 may be made more uniform.

When the internal firebox is utilized with the vertical extension 65 and filled with fuel, such as charcoal, outdoor cooker 10 can maintain a cooking temperature in cooking volume 35 above 200° F. for at least 10 and maybe up to about 25 hours without opening lid 14 and without adding additional fuel 85 to internal firebox 16. This temperature may be maintained steady by cycling the blower 71 on and off responsive to the cooking temperature sensed in cooking volume 35. Because of the sealing strategy using perimeter seal 40, one can have almost total control of the air supply to fire 81. This factor along with the outdoor cooker 10 being double walled and insulated can allow for the fuel 85 to be consumed very slowly with almost all of the heat generated being put into inner chamber 24 rather than lost to the environment as with side mounting fireboxes of the prior art. Thus, almost all of the heat generated by internal firebox 16 stays or is initially released to inner chamber 24 rather than to the surroundings as in many prior art cookers known in the art. This strategy also can serve to greatly reduce the total volume of air moved through outdoor cooker during a cooking session, resulting in the food items 83 being moister than they might otherwise be. In otherwords, prior art cookers tend to move too much air through the cooker which can dry out meats leaving a less than juicy finished product. Temperature in the inner chamber 24 can be varied or stratified by closing the first smoke stack 26 that opens into the inner chamber 24 at a low height, and opening the second smoke stack 27 that opens into the inner chamber 24 at a high height. On the otherhand, temperature variations in the inner chamber 24 can be reduced by opening the first smoke stack 26 and closing the second smoke stack 27.

After a cooking session, outdoor cooker 10 can be easily cleaned by removing grates 47 and the internal firebox from inner chamber 24. The walls and sides of the inner chamber can then be sprayed down, such as by utilizing a hose, or a pressure washer. The drain cap 34 can then be detached to open the drain opening through the bottom of cooker body 23. The waste and liquid can then be removed from cooker body 13, such as into a bucket located under drain opening 33. The further cleaning can be accomplished by rinsing debris from the inner chamber 24 through the drain opening 33. After cleaning inner chamber 24, the drain opening can be reclosed by reattaching drain cap 34. The internal firebox can be separately dismantled and cleaned outside of the cooker body 13. After being cleaned, the internal firebox 16 may be reassembled and returned to inner chamber 24 for a subsequent cooking event.

Outdoor cooker 10 may also be set up for direct high temperature cooking, such as for searing steaks or cooking hamburgers, by sliding one of the grates 47 directly over internal firebox 16 with the top cover 55 of the internal firebox set aside and not used. In addition, the fire on fire grate 54 can be made closer to a cooking surface, possibly by turning the base unit 49 upside down. In addition, because the at least some of the grates 47 within cooking volume 35 may be slid back and forth to the left and right by appropriate mounting on ledges within inner chamber 24, steaks might, for instance, be seared directly over hot coals and then slid aside for indirect cooking to finish steaks to a desired level of doneness. In addition, indirect cooking at medium barbeque temperatures can be accomplished in a manner similar to the slow cooking technique, but by requesting the temperature control system to operate at a much high temperature, such as 350°. Although not necessary, outdoor cooker 10 can also be operated without a temperature control system 70 by monitoring temperature in inner chamber 24 with one or more built in thermometers 48 that can provide a visual indication of temperature at the low height and high height within inner chamber 24 without opening lid 14.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An outdoor cooker comprising:
a cooker body having an inner wall with an inner surface defining a contiguous cooking chamber, and the cooker body defining an air supply passage that extends between the contiguous cooking chamber and an outer surface;
a lid hinged to the cooker body and pivotable with respect to the cooker body between a closed position and an open position, and the lid covering the contiguous cooking chamber in the closed position;
a smokestack attached to one of the cooker body and lid, and opening into the contiguous cooking chamber;
a perimeter seal in contact with the cooker body and lid when the lid is in the closed position, but out of contact with one of the lid and the cooker body when the lid is in the open position;
an internal firebox removably positioned within the contiguous cooking chamber adjacent the inner wall and having a perimeter wall defining a vertical column that includes a fuel and fire chamber separated from an ash and air chamber by a fire grate;
a portion of the perimeter wall defining the air and ash chamber, and the portion of the perimeter wall defining an air inlet that is positioned to fluidly connect the air and ash chamber to the air supply passage;
the perimeter wall further defining an exhaust outlet that opens to the fuel and fire chamber immediately above the fire grate;
the internal firebox having a top cover movable between a closed position in contact with the perimeter wall, and an open position that permits fuel to be loaded into the fuel and fire chamber;
the contiguous cooking chamber including a cooking volume positioned between the exhaust outlet and an opening to the smokestack; and
wherein the top cover and, the fuel and fire chamber, of the internal firebox are accessible when the lid is in the open position, but inaccessible and covered by the lid when the lid is in the closed position.

2. The outdoor cooker of claim 1 wherein the internal firebox includes a hot coal barrier extending across the exhaust outlet; and
a visor attached to an external surface of the perimeter wall positioned immediately above, and extending a width of, the exhaust outlet.

3. The outdoor cooker of claim 1 wherein the internal firebox includes an ash collection tray in contact with the perimeter wall and defining a bottom of the ash and air chamber;
the internal firebox is unattached to the cooker body and is removable from the cooker body for cleaning of the contiguous cooking chamber.

4. The outdoor cooker of claim 1 including a vertical extension with a perimeter wall that mates atop a base unit and more than doubling a volume of the fire and fuel chamber; and
the top cover being positionable atop the vertical extension to close the fuel and fire chamber.

5. The outdoor cooker of claim 1 including a cam latch movable between an unlatched position and a latched position at which the perimeter seal is squeezed, beyond a weight of the lid, between the lid and the cooker body.

6. The outdoor cooker of claim 1 including a temperature control system that includes a blower mounted to the air supply passage, a temperature sensor positioned in the contiguous cooking chamber, and an electronic controller in communication with the temperature sensor and the blower;
the electronic controller being configured to execute a temperature control algorithm to turn the blower on and off responsive to an contiguous cooking chamber temperature below or above, respectively, a preset cooking temperature; and
wherein a fire on the fire grate is starved of air when the blower is off, but air is forced into the ash and air chamber, up through the fire grate and out of the exhaust outlet into the contiguous cooking chamber when the blower is on.

7. The outdoor cooker of claim 1 wherein the cooker body defines a temperature probe port;
a removable plug for closing the probe port; and
the probe port being sized to allow a sensor probe line to extend from the contiguous cooking chamber, through the probe port to an outside of the cooker body.

8. The outdoor cooker of claim 1 wherein the internal firebox includes a hot coal barrier extending across the exhaust outlet;
a visor attached to an external surface of the perimeter wall position immediately above, and extending a width of, the exhaust outlet;
the internal firebox includes an ash collection tray in contact with the perimeter wall and defining a bottom of the ash and air chamber;
the internal firebox is unattached to the cooker body and is removable from the cooker body for cleaning of the contiguous cooking chamber.

9. The outdoor cooker of claim 8 including a vertical extension with a perimeter wall that mates atop the vertical firebox and more than doubling a volume of the fire and fuel chamber; and
the top cover being positionable atop the vertical extension to close the fuel and fire chamber.

10. The outdoor cooker of claim 9 including a cam latch movable between an unlatched position and a latched position at which the perimeter seal is squeezed, beyond a weight of the lid, between the lid and the cooker body;
a temperature control system that includes a blower mounted to the air inlet passage, a temperature sensor positioned in the contiguous cooking chamber, and an electronic controller in communication with the temperature sensor and the blower; and the electronic controller being configured to execute a temperature control algorithm to turn the blower on and off responsive to an contiguous cooking chamber temperature being below or above, respectively, a preset cooking temperature; and wherein the fire grate is starved of air when the blower is off, but air is forced into the ash and air chamber, up through the fire grate and out of the exhaust outlet into the contiguous cooking chamber when the blower is on.

* * * * *